United States Patent [19]

Hardcastle

[11] 4,291,889
[45] Sep. 29, 1981

[54] SEAL FOR WELLHEADS

[75] Inventor: Phillip Hardcastle, Houston, Tex.

[73] Assignee: Cactus Pipe & Supply Co., Inc., Houston, Tex.

[21] Appl. No.: 179,021

[22] Filed: Aug. 18, 1980

[51] Int. Cl.³ ............................................. F16J 15/18
[52] U.S. Cl. ................................. 277/116.4; 285/374
[58] Field of Search ............. 277/102, 107, 108, 116.4, 277/117; 285/432, 311, 374, 360, 348

[56] References Cited

U.S. PATENT DOCUMENTS

| | | | |
|---|---|---|---|
| 1,830,893 | 11/1931 | Tschappat . | |
| 2,532,662 | 12/1950 | Eckel | 285/22 |
| 2,676,036 | 4/1954 | Arrowood | 285/22 |
| 2,874,436 | 2/1959 | Allen | 24/263 |
| 2,874,437 | 2/1959 | Anderson | 24/263 |
| 3,095,627 | 7/1963 | Johnson | 24/263 |
| 3,096,554 | 7/1963 | Johnson | 24/263 |
| 3,127,197 | 3/1964 | Kretzschmar | 285/137 |
| 3,130,987 | 4/1964 | Johnson | 285/146 |
| 3,287,035 | 11/1966 | Greenwood | 285/147 |
| 3,301,567 | 1/1967 | Barr | 277/108 |
| 3,469,629 | 9/1969 | Adamache | 277/116.4 |
| 3,994,517 | 11/1976 | Carmichael | 285/146 |
| 4,116,451 | 9/1978 | Nixon | 277/124 |
| 4,152,015 | 5/1979 | Jones | 285/146 |

*Primary Examiner*—Robert I. Smith
*Attorney, Agent, or Firm*—Hewitt, Kirk, Kimball & Dodge Pravel, Gambrell

[57] ABSTRACT

An annular seal assembly adopted for use in wellheads to seal between a well conduit and a wellhead. The seal ring for sealing between the outer surface of the well conduit and the inner surface of the wellhead is positioned between a lower support ring and an upper follower ring. The upper follower ring controls deformation of the seal ring by distributing the longitudinal forces to uniformly deform the seal ring. A pair of actuating rings are disposed adjacent the follower ring to provide the longitudinal force on urging to the follower by converting relative rotational movement therebetween to longitudinal movement or expansion between said actuating rings. Such longitudinal movement is confined to produce the longitudinal urging to deform the seal. Engaged cam on the actuating rings produce increased longitudinal movement in response to a hold-down screw enlarging a gapped opening formed in the actuating rings.

2 Claims, 2 Drawing Figures

SEAL FOR WELLHEADS

DESCRIPTION

1. Technical Field

This invention relates to the field for seals for use in wellheads and particularly for seals actuated by lockdown screws.

In my copending application, Ser. No. 121,435, filed Feb. 14, 1980, there is disclosed a "Pipe Hanger" for supporting and sealing a conduit in a well. That application also identified and considered the disclosure of a number of prior art patents relating to wellheads and the seals for use in such wellheads. By this reference that application and the cited prior art patents all of those instruments are hereby incorporated as if fully set forth herein.

In my previously mentioned application the annular seal is actuated by longitudinal motion of the hanger assembly in supporting the weight of the pipe. This requires a complex telescoping or lost motion structure construction to enable the relative motion to set the seal and which construction is expensive to manufacture. In the event of seal leakage, the seal is difficult, if not impossible, to satisfactorily repair.

Some wellhead seals are arranged separately from the pipe supports and could not use the weight of the supported pipe to deform or actuate the seal. Such seals have been frequently actuated by pressure of a confined lubricant in a wellhead chamber. Such seal actuation has not assured uniform seal deformation and leaks with this type of seal have been frequent although somewhat easier to repair. Another common approach to actuate a wellhead seal is to have a tapered nose of a wellhead lockscrew move the seal follower longitudinally in the wellhead. This provides a very limited range of longitudinal movement for the follower which, when coupled with seal assembly manufacturing tolerances, may not sufficiently deform the seal to establish and maintain the desired seal.

DISCLOSURE OF THE INVENTION

The present invention provides a new and improved wellhead seal apparatus for sealing the annular area between the wellhead and a well pipe operably positioned therein. The seal apparatus includes a lower support ring and an upper packing follower ring for deforming the resilient seal ring disposed therebetween. A pair of seal actuating rings are disposed above the follower ring for providing the controlled longitudinal movement to deform the seal ring. The actuating rings form a gapped opening having one of the rings forming one side of the opening and the other ring forming the other side of the opening. A tapered nose of a wellhead lockscrew engages the two sides of the gapped opening to expand the opening and provide relative circumferential rotation between the actuating rings. Engaged tapered cam surfaces formed on each of the actuating rings produce relative longitudinal expansion motion in response to the rotational movement to deform the seal. By providing the cam surfaces on the rings, the longitudinal movement of the actuating rings may be increased or multiplied over that provided by the tapered nose of the holddown screw normally used to actuate such seals. This provides greater longitudinal movement and thereby a more reliable and complete actuation of the annular seal.

BEST MODE FOR CARRYING OUT THE INVENTION

Figure 1:
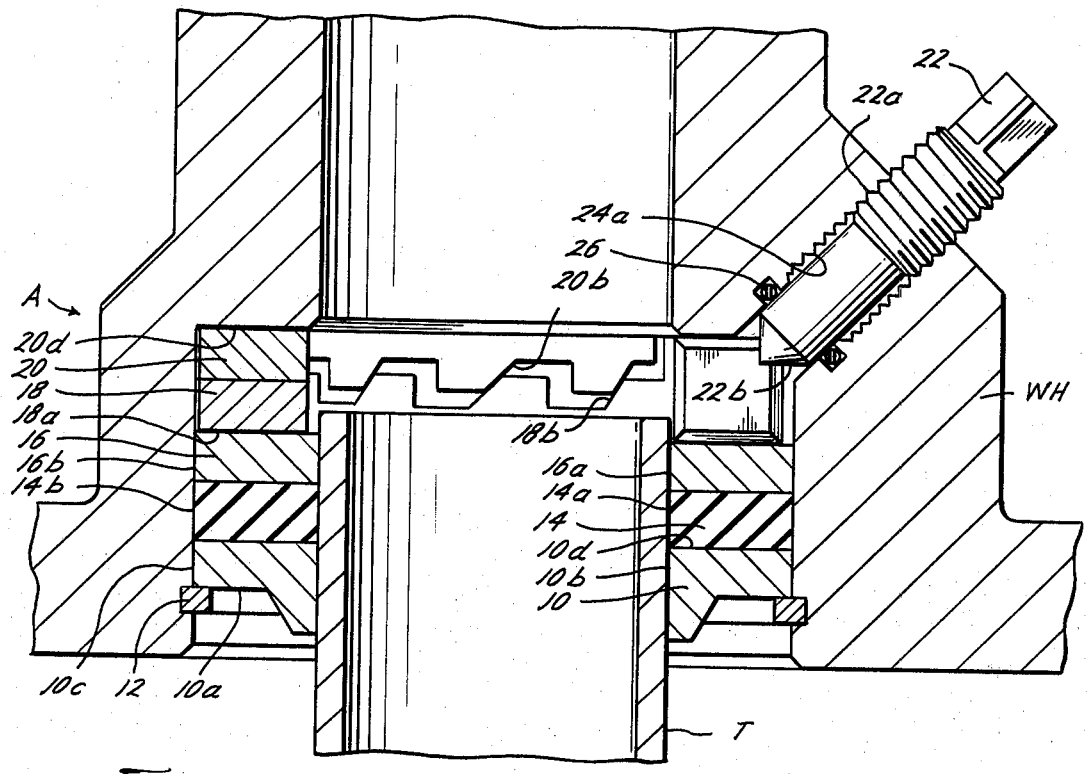
FIG. 1 is a side view, in section, of the seal assembly of the present invention operably installed in a wellhead.

The annular seal apparatus of the present invention generally designated A in the Figs. is used to seal in a wellhead between a tubular conduit T and a wellhead WH. The apparatus A is disposed exteriorly of the well pipe T for blocking passage of well fluid between the outer surface of the pipe T and the wellhead WH. The pipe T is concentrically positioned and supported against longitudinal movement in the wellhead WH (by means herein not illustrated) as is well known.

The annular seal assembly A includes a lower support ring 10 for securing against downward movement in the wellhead WH by gapped retainer snap ring 12 which releasably secures the seal apparatus A in the wellhead WH as is well known. The retainer snap ring 12 engages the downwardly facing annular shoulder or surface 10a of the retainer ring 12 for preventing longitudinal downward movement in the wellhead WH. The support ring 10 has an inner surface 10b defining a passageway through which the pipe T extends. The outer surface 10c of the ring is positioned adjacent to the wellhead WH for substantially filling the annular space between the pipe T and the wellhead WH for containing or trapping annular seal 14 that is carried or supported on the upwardly facing annular surface 10d.

The annular seal ring 14 has an inner surface 14a and an outer surface 14b that prior to deformation are formed with diameters substantially equal to the diameters of the outer surface of the pipe T and the inner surface of the wellhead WH. This insures a proper seal between the pipe T and the wellhead WH when the seal ring 14 is deformed.

Disposed above the annular ring 14 is an upper retainer and follower ring 16 which serves to distribute the contained longitudinal movement or forces thereon to uniformly deform the seal 14. The follower ring 16 has an inner surface 16a disposed adjacent the pipe T and the outer surface 16b disposed adjacent the wellhead WH to insure full deformation loading on the seal ring 14 as is well known in the art.

Figure 2:
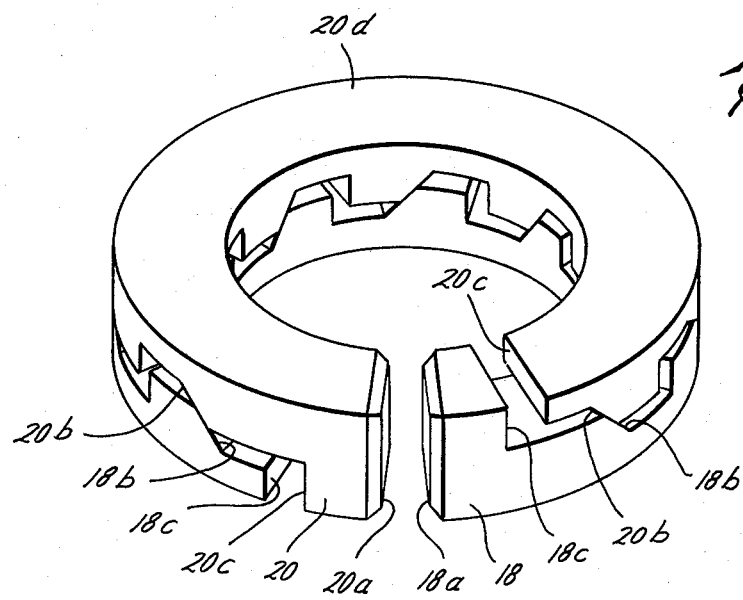
FIG. 2 is a perspective view of the engaged actuating rings of the seal assembly that are used to provide the longitudinal movement to operate the seal assembly.

Located above the follower ring 16 are the actuating rings (18, 20) which provide longitudinal expansion or movement therebetween along the longitudinal axis formed by the seal apparatus A in response to relative circumferential rotation of the rings 18, 20. As best illustrated in FIG. 2 the actuating rings 18 and 20 form a gapped opening 22 defined by the first surface 18a of the actuating ring 18 and a second surface 20a formed by the actuating ring 20.

The actuating ring 18 is provided with a plurality of upwardly facing tapered surfaces 18b at spaced circumferential locations. The actuating ring 20 is provided with a mating or complimentary downwardly facing tapered cam surface 20b which engaged the cam surfaces 18b for wedging the rings 18 and 20 longitudinally apart in response to relative circumferential rotation therebetween. The ring 18 is provided with a stop shoulder 18c which engages the shoulder 20c for defining the range of relative rotation between the two rings. A similar movement stop is provided by the shoulder 20c in conjunction with the shoulders 20c and 18c. The saw-tooth effect provided by the surfaces 18c and 20c provide clearance for the actuating rings 18 and 20 to permit assembly in a longitudinal contracted position and enable longitudinal expansion upon the relative circumferential rotation. The upper ring 20 has an upwardly facing shoulder 20d which is confined by the wellhead WH. The lower surface 18d of the lower actuating ring 18 engages the follower 16 for affecting its desired longitudinal operating movement.

To actuate or operate the annular seal apparatus A the wellhead WH is provided with a lockdown or holddown screw 22 having threads 22a which engage the threaded opening 24a formed in the wellhead. The lockscrew 22 has a tapered nose or head 22b which is received between the gapped surfaces 18a and 20a of the actuating rings 18 and 20 to produce the relative circumferential rotation of the actuating rings 18 and 20 as the lockscrew 22 is rotated to move inwardly in the wellhead WH as is known. An O'ring 26 carried by the wellhead WH prevents leakage of fluids between the lockscrew 22 and the wellhead WH in the usual manner.

The formation of the cam surfaces 18b and 20b on both actuating rings 18 and 20 serve as a multiplier for providing greater longitudinal movement or expansion of the actuating rings 18, 20 than would normally be achieved by the nose taper 22b of the lockscrew 22. This insures greater longitudinal deformation of the annular seal 14 to increase the reliability seal between the wellpipe T and wellhead WH.

OPERATION

In the use and operation of the present invention the well seal apparatus A of the present invention is assembled in the wellhead WH in the manner illustrated. The lockscrew 22 may be made up in the wellhead WH but is not rotated to move inwardly to engage the spaced surfaces 18a and 20a. When the well pipe T is properly suspended or supported in the well and cut off to the proper dimension illustrated, the wellhead WH is placed over the pipe T and secured to the casing head (not illustrated).

When it is desired to effect the seal by the apparatus A, the lock or holddown screw 22 is rotated to move the tapered nose 22b into engagement with the surfaces 18a and 20a and to affect relative circumferential rotation between the actuating members 18 and 20. As the lockscrew 22 separates the surfaces 18a and 20a there is affected relative rotation between the actuating rings 18 and 22 and which relative circumferential rotation causes longitudinal expansion of the actuating rings 18 and 20 by the engagement of the tapered or wedging surfaces 18b and 20b. Because the upper actuating ring 20 is contained by the wellhead WH, the expansion of the actuating ring is 18 to 20 forces seal follower 16 to move downwardly to deform the seal ring 14 and establish the desired seal between the wellhead WH and the outer surface of the pipe T.

The foregoing disclosure and description of the invention are illustrative and explanatory thereof, and various changes in the size, shape and materials, as well as in the details of the illustrated construction may be made without departing from the spirit of the invention.

I claim:

1. An annular seal assembly adapted for use in wellheads to seal between a well conduit and the wellhead, including:
    a resilient seal ring adapted to be placed between the outer surface of the well conduit and the inner surface of the wellhead for sealing deformation therebetween to block passage of well fluids;
    a follower ring disposed adjacent said resilient seal ring for controlling deformation of said seal ring to effect the desired seal in response to the application of a longitudinal oriented force to said follower;
    means operably connected with said packing follower for urging in a longitudinal oriented direction on said packing follower to deform said seal ring, said means for urging including a pair of cooperating actuating rings having means for converting relative rotational movement therebetween to longitudinal expansion of said actuating rings for providing the longitudinal oriented force; and
    said actuating rings forming a gapped opening with one of said rings forming a first side of said gapped opening and the other of said actuating rings forming a second side of said gapped opening to produce relative rotational movement between said actuating rings by expanding said gapped opening.

2. The annular seal assembly as set forth in claim 1, wherein:
    said first side and said second side of said gapped opening of said actuating rings engagable with a wellhead holddown screw to actuate said annular seal ring.

* * * * *